United States Patent [19]

Reetz

[11] Patent Number: 5,356,278
[45] Date of Patent: Oct. 18, 1994

[54] APPARATUS FOR MAKING A THERMOPLASTIC COMPOSITE

[76] Inventor: William R. Reetz, 1829 Roanoke Dr., Boise, Id. 83712

[21] Appl. No.: 959,228

[22] Filed: Oct. 9, 1992

Related U.S. Application Data

[63] Continuation-in-part of Ser. No. 677,416, Mar. 29, 1991, Pat. No. 5,155,146.

[51] Int. Cl.$^5$ .............................................. B29C 47/00
[52] U.S. Cl. ................................... 425/111; 264/174; 264/271.1; 425/114; 425/378.1
[58] Field of Search ................ 264/174, 176.1, 259, 264/271.1; 425/111, 113, 114, 376.1, 378.1, 382.4, 505

[56]  References Cited

U.S. PATENT DOCUMENTS

| 2,611,941 | 9/1952 | Leitl ..................................... 425/114 |
| 3,019,483 | 2/1962 | Schultheiss ........................ 425/114 |
| 3,023,136 | 2/1962 | Himmelheber . |
| 3,025,202 | 4/1962 | Morgan et al. . |
| 3,146,508 | 9/1964 | Berliner et al. ..................... 425/114 |
| 3,257,338 | 6/1966 | Sefton . |
| 3,383,228 | 5/1968 | Rekate et al. . |

(List continued on next page.)

FOREIGN PATENT DOCUMENTS

| 1281679 | 10/1968 | Fed. Rep. of Germany . |
| 1496935 | 10/1966 | France . |
| 37-13334 | 9/1962 | Japan . |
| 38-23786 | 11/1963 | Japan . |
| 45-3233 | 2/1970 | Japan . |
| 50757 | 1/1975 | Japan . |
| 50-29841 | 9/1975 | Japan . |
| 52-39566 | 10/1977 | Japan . |
| 288293 | 1/1971 | U.S.S.R. . |
| 1090741 | 11/1967 | United Kingdom . |
| 1502777 | 3/1978 | United Kingdom . |

OTHER PUBLICATIONS

H. E. Alford and f. Veatch, "Glass Microballoon Particles, a Low-Density Filler", *Modern Plastics*, Nov, 1961.

Primary Examiner—Charles S. Bushey
Attorney, Agent, or Firm—Kolisch Hartwell Dickinson McCormack & Heuser

[57]  ABSTRACT

Apparatus for making a reinforced thermoplastic composite is disclosed. The apparatus is designed for making such composite from a dry blend of expanded thermoplastic pieces and filler particles of ambient temperature. The thermoplastic composite includes a quantity of expanded thermoplastic pieces and a quantity of filler particles suspended by the pieces, with the quantity being up to 60% by weight of the blend. The apparatus includes a first elongate compartment defining a low-pressure compression chamber, and a feeder for sequentially transferring the blend to the first compartment in preselected amounts. A second elongate compartment defines a high-pressure compression chamber with open ends and an entry section structured with a port. The second compartment is positioned adjacent the first compartment so that the chambers are in communication with each other via the port. The apparatus also includes a plurality of reinforcing strands for feeding through the high-pressure chamber, with each such strand having a front section which is positioned in the entry section. Heating structure is provided for heating the high-pressure chamber. A low-pressure compressor is included to compress the blend in the low-pressure chamber and transfer it to the entry section around the front sections of the strands. A high-pressure compressor is included to compress the blend around the strands in the heated high-pressure chamber to form a molten reinforced thermoplastic composite, and to transfer the same out of the chamber where it can cool, thus to form a reinforced thermoplastic composite.

6 Claims, 5 Drawing Sheets

U.S. PATENT DOCUMENTS

| | | |
|---|---|---|
| 3,440,072 | 4/1969 | Daubenspeck et al. . |
| 3,483,597 | 12/1969 | Windeler et al. . |
| 3,503,840 | 3/1970 | Parrish . |
| 3,547,815 | 3/1970 | Frank . |
| 3,547,840 | 12/1970 | Stastny et al. . |
| 3,644,271 | 2/1972 | Tulley . |
| 3,694,118 | 9/1972 | Crowder .............................. 425/111 |
| 3,708,256 | 1/1973 | Kopp . |
| 3,718,536 | 2/1973 | Downs et al. . |
| 3,734,985 | 5/1973 | Greenberg . |
| 3,790,421 | 2/1974 | Habgood, Jr. . |
| 3,846,265 | 11/1974 | Yamaguchi et al. . |
| 3,876,744 | 4/1975 | Onder . |
| 3,914,359 | 10/1975 | Bevan . |
| 3,958,069 | 5/1976 | Gaylord . |
| 3,983,295 | 9/1976 | Murer et al. . |
| 3,995,980 | 12/1976 | Smith . |
| 4,011,183 | 3/1977 | Ruff . |
| 4,014,826 | 3/1977 | Yunan . |
| 4,031,179 | 6/1977 | Tatzel et al. . |
| 4,085,247 | 4/1978 | Godfried . |
| 4,101,050 | 7/1978 | Buckler et al. . |
| 4,115,509 | 9/1978 | Kendall-Smith et al. . |
| 4,182,641 | 1/1980 | Fitts . |
| 4,229,398 | 10/1980 | Harvey . |
| 4,316,934 | 2/1982 | Maier et al. . |
| 4,322,260 | 3/1982 | Conlon . |
| 4,358,418 | 11/1982 | Heggenstaller . |
| 4,361,613 | 11/1982 | Bogner et al. . |
| 4,413,969 | 11/1983 | McDonald . |
| 4,421,710 | 12/1983 | Borcoman ........................... 425/111 |
| 4,517,308 | 5/1985 | Ehlenz et al. . |
| 4,521,477 | 6/1985 | Kiss . |
| 4,537,823 | 8/1985 | Tsang et al. . |
| 4,555,439 | 11/1985 | Ueeda et al. . |
| 4,596,738 | 6/1986 | Metcalfe et al. . |
| 4,603,078 | 7/1986 | Zanker et al. . |
| 4,623,150 | 11/1986 | Moehlman et al. . |
| 4,643,940 | 2/1987 | Shaw et al. . |
| 4,649,034 | 8/1987 | Gramelspacher . |
| 4,718,839 | 1/1988 | Paakkinen ........................... 425/111 |
| 4,822,694 | 4/1989 | Randin et al. . |
| 4,859,352 | 8/1990 | Steinau et al. . |
| 5,084,221 | 1/1992 | Matsuno et al. .................... 425/114 |

FIG.19 ic composite.

APPARATUS FOR MAKING A THERMOPLASTIC COMPOSITE

This is a continuation-in-part of application Serial No. 07/677,416, filed Mar. 29, 1991 now U.S. Pat. No. 5,155,146.

BACKGROUND OF THE INVENTION

The present invention relates to apparatus for making plastic composites, and more particularly to such apparatus for making a thermoplastic composite.

Conventional devices for making composites from thermoplastic resins are expensive and complicated compared to those for making composites from thermoset resins. The key reason for such distinction is the relatively high viscosities associated with thermoplastic resins compared to thermoset resins. The higher the resin viscosity, the more difficult it is to achieve the required degree of wetting of filler to produce, ultimately, a uniform, cohesive end product.

There remains a need to provide improved apparatus for making a thermoplastic composite because thermoplastic resins are substantially less expensive than thermoset resins. In addition, thermoplastic resins are sometimes preferred because they impart certain desired properties to the composite, such as desired compressive strength, wear resistance, etc.

Presently, there are at least two known systems of mixing thermoplastic polymers with powder-like fillers. In one system, solid thermoplastic pellets and filler powder are pre-mixed and then passed through a heated extruder where the pellets are melted, the pellets and powder are mixed by a mechanical device, and the molten composite is ejected. In another system, heat and extremely high pressure are used to force the mixture of thermoplastic pellets and filler powder through a die and into a mold.

To mix thermoplastic polymers with non-powdered fillers, there are at least three conventional systems. In one system, filler particles are individually dipped in a hot viscous bath of thermoplastic resin and then, after cooling, the dip-coated filler particles are woven into a fabric-like form. Next, such fabric-like material is positioned in a mold with additional thermoplastic resin. Heat is then applied causing the additional thermoplastic resin to melt into and around areas of the fabric-like material to fill in dry spots where the dip-coating step may not have sufficiently wetted the material.

An alternative system involves using extremely high-pressure injection of thermoplastic material into a mold to coat certain types of fillers. A limited number of fillers are usable in such systems because of such extreme environment.

It is also known to make relatively thin sections of composite material by layering thermoplastic pellets and filler material in a mold followed by heating the mold.

Accordingly, it is a principal object of the present invention to provide apparatus for making a thermoplastic composite that overcomes the drawbacks, such as those just mentioned, associated with conventional systems.

Another object of the present invention is to provide such apparatus for making a thermoplastic composite that is a solid, homogenous, non-foamed material that can be easily and relatively inexpensively manufactured.

A still further object is to provide the described apparatus that will provide optimal heating efficiency with respect to heating the thermoplastic/filler mixture, thus to convert the mixture into a flowable state that promotes proper bonding and ultimately, improved forming of the thermoplastic composite.

SUMMARY OF THE INVENTION

The present invention achieves the above objects by providing apparatus for making a thermoplastic, preferably reinforced, composite from a to-be-identified dry blend. The apparatus includes a first elongate compartment defining a low-pressure compression chamber, and a feeder for sequentially transferring the blend to the first compartment in preselected amounts. Also included is a second elongate compartment defining a high-pressure compression chamber with open ends and an entry section structured with a port. The second compartment is positioned adjacent the first compartment so that the chambers are in communication with each other via the port. The apparatus preferably includes a plurality of reinforcing strands for feeding through the high-pressure chamber, with each such strand having a front section which is positioned in the entry section.

The apparatus of the invention also includes means for heating the high-pressure chamber, and a low-pressure compressor to compress the blend in the low-pressure chamber and transfer it to the entry section around the front sections of the strands. A high-pressure compressor is included to compress the blend around the strands in the heated high-pressure chamber to form a molten reinforced thermoplastic composite, and for transferring the molten composite out of the chamber where it can cool, thus to form a reinforced thermoplastic composite.

These and additional objects and advantages of the present invention will be more readily understood after a consideration of the drawings and the detailed description of the preferred embodiment.

DETAILED DESCRIPTION OF THE PREFERRED EMBODIMENTS

The following description is provided in two parts. First, FIGS. 1-6 will be described to provide helpful background information concerning (1) the dry blend used with the apparatus of the present invention, and (2) the method of making a thermoplastic composite, which method is also described in my U.S. Pat. No. 5,155,416. Second, after providing such background, the apparatus of the present invention will be described in connection with FIGS. 7-20.

Figure 1A:
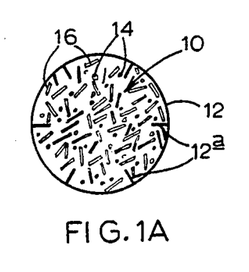
FIG. 1A is a side sectional view of the dry blend disposed is a mixing vessel prior to use in the apparatus of the present invention.

Turning now to FIGS. 1-6 and the background information, FIG. 1A shows ambient temperature, dry blend 10 of the present invention disposed in a mixing vessel 12 with plural tumbling vanes 12a. Blend 10 is made of a quantity of expanded thermoplastic pieces 14 and a quantity of filler particles 16 suspended by the pieces. As shown in the drawings, pieces 14 and particles 16 are enlarged to aid the reader in understanding the invention. Those skilled in the art will appreciate that in a true-to-scale drawing of blend 10 both the pieces and particles would be smaller, and the blend would look denser. Blend 10 may include pieces 14 and particles 16, and in addition, a quantity of unexpanded thermoplastic pieces (undepicted).

The blend is formed by dry mixing pieces 14 and particles 16 in vessel 12 for a sufficient period of time so that the particles are suspended by the pieces. The relatively lightweight expanded thermoplastic pieces are surprisingly effective at suspending the relatively heavy filler particles.

Preferably, the pieces are made from waste, expanded thermoplastic such as EPS (expanded polystyrene). Waste EPS can be broken into pieces by feeding it through conventional shredding devices similar to paper-shredding equipment.

The filler particles are preferably chosen from the group consisting of wood chips, cellulose, carbon, KEVLAR® polyaramid material, or glass fibers. However, any desired filler known to those skilled in the art may be used. As will be understood shortly, woven fabric filler sections may also be used as filler particles in dry blend 10.

Figure 6:
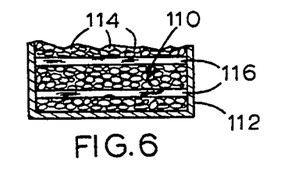
FIG. 6 is a fragmentary, side sectional view of a second type of dry blend for use in the apparatus of the present invention.

The dry mixing operation can be performed by rotating, oscillating, tumbling, or shaking vessel 12. Turning ahead for a moment to FIG. 6, a second embodiment of the dry blend is shown at 110 and is dry mixed by layering woven fabric filler sections 116 and pieces 114 in a vessel 112.

Referring now to FIGS. 1B-3, dry blend 10 is shown with processing equipment of the present invention for practicing the method of making a thermoplastic composite, which method is described in my U.S. Pat. No. 5,155,416. It should be understood that suitable support structure (undepicted) is used for the equipment shown in the remaining drawings. The equipment includes a hopper 18 positioned over an entry port 20 of a chamber 22. Referring to the right of FIG. 1B, an extruder die 23 is attached to the downstream end of chamber 22. Dry blend 10 is placed or dispensed into the chamber from the hopper via the entry port.

Figure 2:
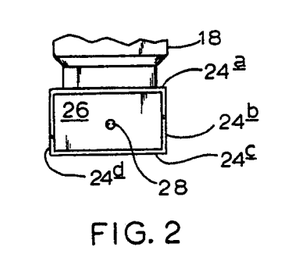
FIG. 2 is a front sectional view of FIG. 1B through line 2—2.
Figure 3:
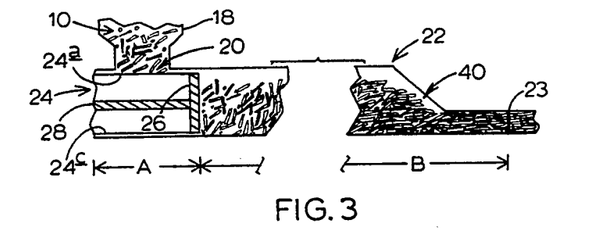
FIG. 3 is like FIG. 1B except that another step of the method of making a thermoplastic composite is shown.

Bidirectionally extendable across the inside of the chamber is a ram 24 that includes a ram plate 26 and side walls 24a-d (see FIG. 2). Suitably fastened to the back surface of ram plate 26 is a push rod 28. Rod 28 is attached to a conventional hydraulic power device (undepicted) so that ram 24 can be moved through chamber 22 as shown in FIG. 3.

Still referring to FIGS. 1B-3, sides 24a-d of ram 24 are slidable along inside surfaces of chamber 22. Side 24d prevents further dispensing of blend 10 during soon to be described compressing and heated compressing steps of the method of making a thermoplastic composite. As will be further explained, the portion of chamber 22 above the bracketed section designated as A is the place where the compressing step of the method begins. The portion of chamber 22 above the bracketed area designated as B is where the soon to be described heated compressing step takes place.

Figure 1B:
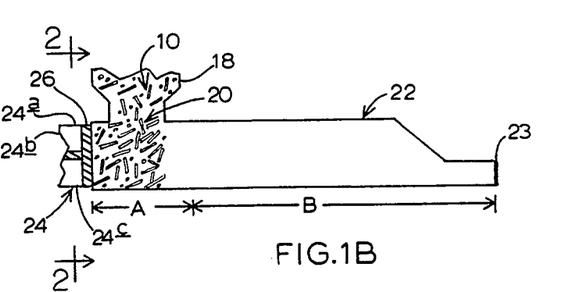
FIG. 1B is a side sectional view of the apparatus of the present invention being used to practice the method of making a thermoplastic composite.
Figure 4:
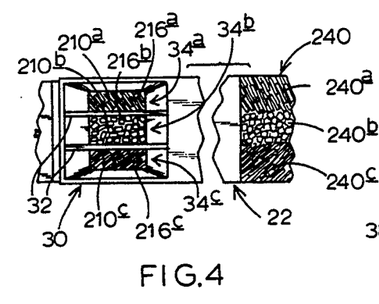
FIG. 4 is a fragmentary, top view of an apparatus like that shown in FIG. 3 except that a portion of the apparatus has been modified to practice another step of making a thermoplastic composite.

Referring to FIG. 4, chamber 22 is shown with a modified top hopper 30 mounted over entry port 20 (FIG. 1B). Hopper 30 includes partitions 32 which divide the hopper into sections 34a-c. The partitioned hopper is used to practice a soon to be described step that results in the formation of a zoned thermoplastic composite through use of the apparatus of the present invention.

Figure 5:
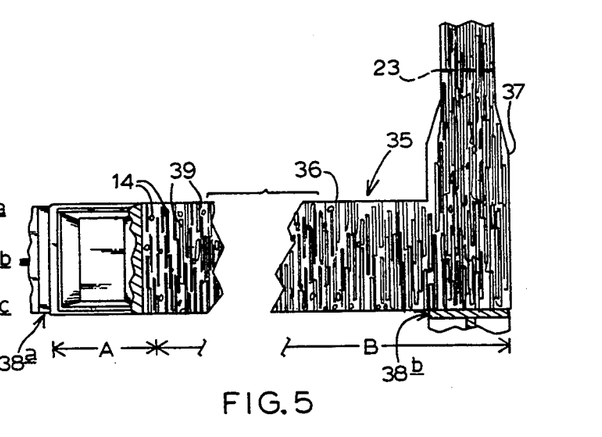
FIG. 5 is a top view of equipment similar to that shown in FIG. 3 with portions broken away to show modifications for processing certain types of filler particles.

Referring to FIG. 5, certain modified, process equipment is shown, which equipment is usable to practice the to be described thermoplastic-composite-making method. A modified chamber 35 is shown which includes a first chamber section 36 and a second chamber section 37. Rams 38a,38b are bidirectionally extendable through chamber sections 36,37, respectively. Chambers 36 and 37 are designed for processing a type of dry blend that includes expanded thermoplastic pieces 14 and rod-shaped filler particles 39. The details of this processing will be described below.

Figure 7:
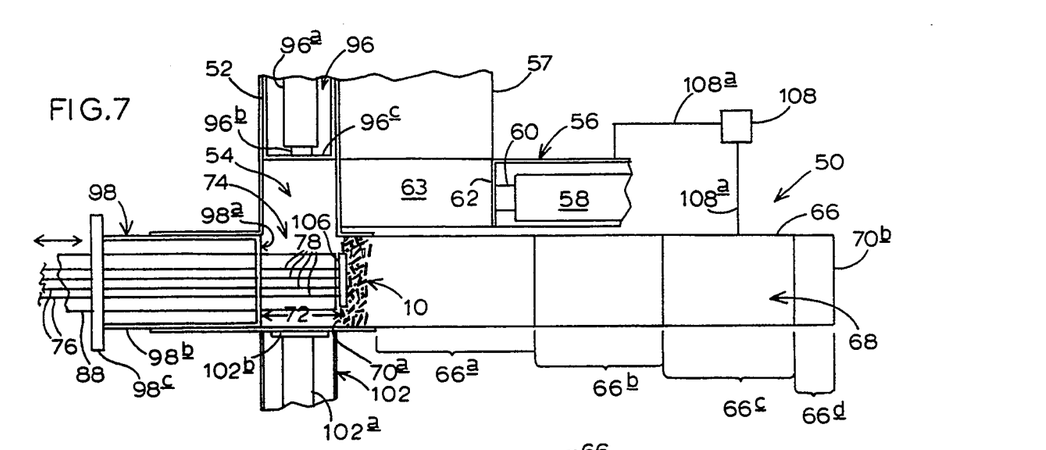
FIG. 7 is a side sectional view showing a first embodiment of the apparatus of the present invention.

FIGS. 7-20 show the apparatus of the present invention. In FIG. 7, the apparatus is shown generally at 50. Apparatus 50 is for making a reinforced thermoplastic composite from a dry blend of expanded thermoplastic pieces and filler particles as described above. As will be understood, the composite made using apparatus 50 may be thought of as a preliminary composite because it is in a molten form when it exits the apparatus. Then, as described below, that molten composite is cooled and processed further according to conventional procedures. As will be shown below, apparatus 50 is for, among other things, adding a reinforced feature to a thermoplastic composite like that described above.

Still referring to FIG. 7, apparatus 50 includes a first elongate compartment 52 defining a low-pressure compression chamber 54. Adjacent first compartment 52 is a feeder 56 for sequentially transferring dry blend 10 (FIG. 1) to the first compartment in preselected amounts. A hopper 57 may be suitably positioned above feeder 56 to deliver the preselected amount of the dry blend to the feeder for sequential transferring. Preselected amounts may be dispensed from the hopper using what is known as a slider plate (undepicted) that may be fitted adjacent a port (undepicted) of the hopper to control the amount of material being dispensed.

Feeder 56 may be structured as shown with a hydraulic cylinder 58 suitably mounted on support structure (undepicted) and a push rod 60 which is bidirectionally extendable out of the cylinder to move feeder structure 62 in a feeder channel 63 toward low-pressure compression chamber 54.

Figure 13:
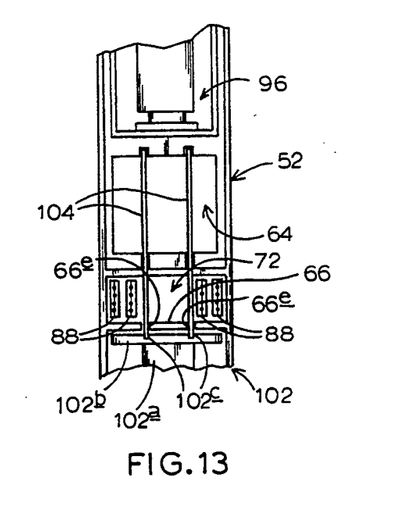
FIG. 13 is a front sectional view of the apparatus of the invention showing the reciprocable inserter in the first position with partitions inserted through portions of both compression chambers.
Figure 14:
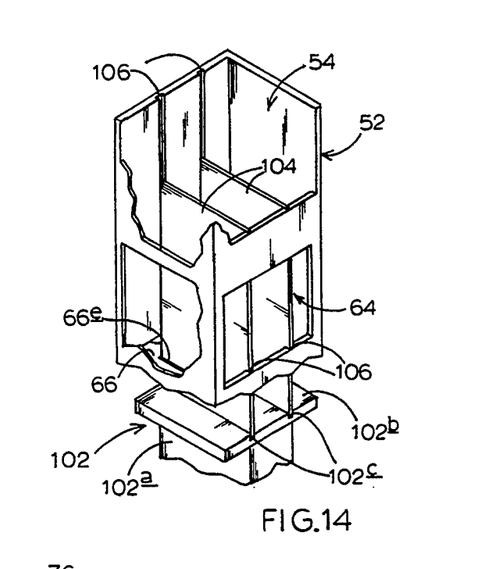
FIG. 14 is a portion of the first compartment shown in FIG. 13, being viewed from a different angle, and with sections broken away to show detail.

Referring for a moment to FIGS. 13 and 14, feeder 56 moves material into low-pressure chamber 54 via a suitable feeder port 64 formed in first compartment 52.

Referring again to FIG. 7, apparatus 50 also includes a second elongate compartment 66 which defines a high-pressure compression chamber 68 with open ends 70a, 70b. Second compartment 66 also includes an entry section 72 structured with a port 74 which allows both chambers 54, 68 to communicate with each other. For reasons to be described below, compartment 66 may be thought of in terms of subsections 66a-d.

Figure 8:
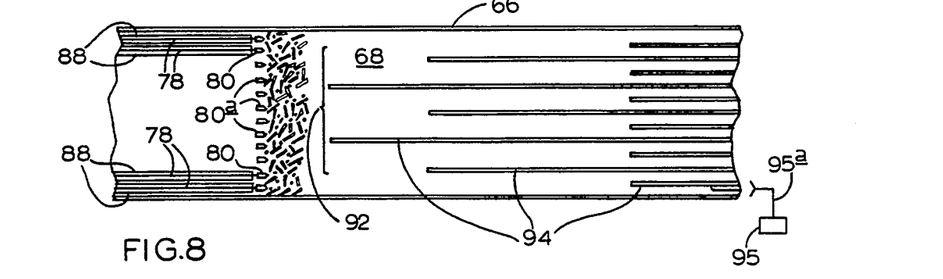
FIG. 8 is a top fragmentary enlarged view of the apparatus of FIG. 7 with certain elements omitted to show the inside of the high-compression chamber.

Referring to FIGS. 7-8, apparatus 50 includes a plurality of reinforcing strands 76 that are to be fed through high-pressure chamber 68. Strands 76 can be continuous fiberglass or any other suitable material. Strands 76 may be fed from any suitable strand-dispensing mechanism such as what is known in the art as a strand, or fiber creel. Such a creel is designed to provide a tensioned release of strands.

Still referring to FIGS. 7-8, each of strands 76 have corresponding front sections 78 which are positioned in entry section 72 during an operation step that will be described below.

Figure 11:
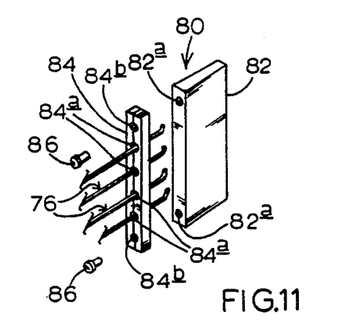
FIG. 11 is an isometric view of a tensioning member usable in the apparatus of FIG. 7.

Referring to FIGS. 8, 11-12, and 16, apparatus 50 also includes a plurality of tensioning members 80 which may be removably attached to front section 78 of desired strands 76. Referring to FIG. 11, tensioning member 80 is preferably formed as a wedge, including a wedge submember 82 and a bar 84 with suitable holes 84a formed therein. Bar 84 also has a pair of holes 84b that are alignable with threaded bores of 82a of submember 82, both for receiving bolts 86.

Referring to FIGS. 12-13 and 15-16, apparatus 50 also includes protective guide structure 88. Guide structure 88 may be formed of sections 90a, 90b (FIG. 16) that have grooves formed in them so that when the two sections are fastened together using suitable fasteners (undepicted), holes are formed through which strands 76 may be fed to extend through the structure.

Referring back to FIG. 8, apparatus 50 includes heating structure 92 for heating high-pressure chamber 68. Heating structure 92 may take the form of any of the above-described heating means. As shown in FIG. 8, the heating structure may take the form of a plurality of novel heat vanes 94 which are suitably positioned to extend from the top to the bottom of high-pressure chamber 68 and to define paths of varying widths. As will be described in connection with the operation of apparatus 50, positioning vanes 94 as in FIG. 8 allows the blend to be pushed between the vanes and through the chamber.

Still referring to FIG. 8, the vanes may be made out of any suitable metal and must be operatively connected to a suitable heater 95 via a conductor 95a. Only one vane 94 is shown connected to heater 95, but those skilled in the art will appreciate that all vanes 94 should be connected to a suitable heater, or heaters.

Referring to FIG. 7 and 8, the vanes are positioned to define relatively wide paths in subsection 66a, and progressively narrower paths in subsections 66b-66c. No vanes are positioned in subsection 66d, which may be constructed with parallel sides, or may be angled inwardly to aid in compressing the to-be-described molten reinforced thermoplastic composite when the same is pushed therethrough. Constructing subsection 66d with parallel sides has been found preferable to allow the molten material to continue mixing during this late stage in the process.

Figures 9, 10:
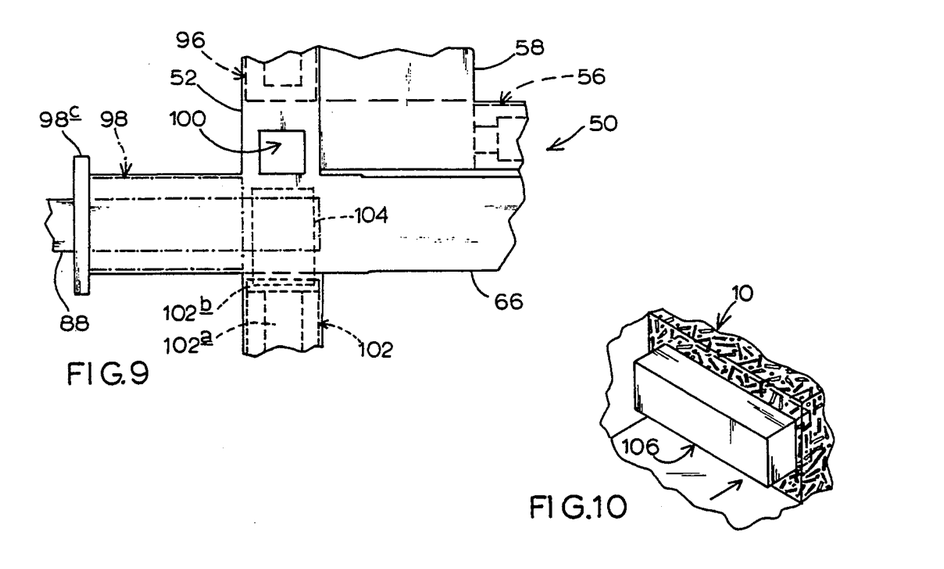
FIG. 9 is a fragmentary side view of the apparatus shown in FIG. 7.
FIG. 10 is a fragmentary isometric view of a portion of the inside of the high-compression chamber.

Referring to FIG. 7 and 9, apparatus 50 includes a low-pressure compressor 96 and a high-pressure compressor 98. Low-pressure compressor 96 includes a hydraulic cylinder 96a, a push rod 96b, and a compressor-plate member 96c.

Figure 16:
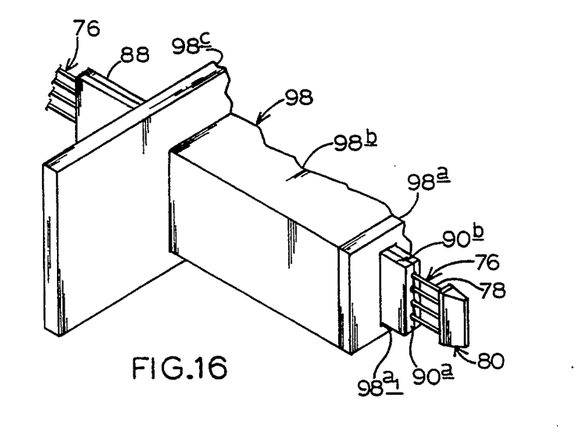
FIG. 16 is an isometric view of certain components of the apparatus shown in FIG. 15 with the addition of certain other elements of the invention.

Referring to FIGS. 7, 9 and 16, a first embodiment of high-pressure compressor 98 includes a ram plate 98a with opening structure such as a slot 98a₁ (FIG. 16) formed therein. Another preferred embodiment of the high-pressure compressor of the invention will be discussed below in connection with FIGS. 17-20. For now, continuing with the description of the first embodiment of high-compressor 98, reference is made to FIG. 16, where slot 98a₁ is shown which allows guide structure 88 to extend therethrough. The opening structure may include additional slots formed in ram plate 98a depending on the desired number of guide structures 88 being used. High-pressure compressor 98 also includes hollow box (or holder) structure 98b and support plate 98c with a hole formed therein for receiving box structure 98b.

Figure 15:
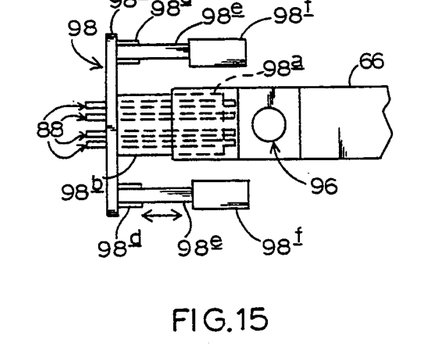
FIG. 15 is a top fragmentary view of the apparatus shown in FIG. 7.

Referring to FIG. 15, plate 98c is connected by suitable fasteners 98d to push rods 98e that are bidirectionally extendable from hydraulic cylinders 98f.

Both compressors 96, 98 are structured to move bidirectionally in compression strokes. The compression stroke for low-pressure compressor 96 would be from its retracted position shown in FIG. 7 to an extended position (undepicted) adjacent port 74 of second compartment 66. High-pressure compressor 98 is movable bidirectionally from a retracted position shown in FIGS. 7 to an extended position adjacent the left side of dry blend 10 (FIG. 7) as shown in FIG. 9.

Both compressors 96, 98 also perform a transferring function. That is, low-pressure compressor 96 transfers the blend to entry section 72. High-pressure compressor transfers the low-pressure compressed blend to approximately the position of dry blend 10 in FIG. 7. By sequentially adding additional pre-selected amounts of dry blend and performing the low-pressure and high-pressure compressing operations, the compressed blend will be pushed through chamber 66 in the paths defined by heat vanes 94 so that a molten, reinforced thermoplastic composite is formed.

By performing additional compressing operations, the molten thermoplastic composite will be pushed out of chamber 66 through opening 70b where it can be cooled and further processed using conventional rollers and the like to form a reinforced thermoplastic composite. High-pressure compressor 98 bidirectionally moves ram plate 98a at a suitable rate to prevent it from being gummed up by molten thermoplastic composite. An acceptable threshold for such rate has been found to be a material-exit rate above 2 inches/minute. By material-exit rate, applicant means the rate at which the molten composite exits apparatus 50.

Referring to FIG. 9, first compartment 52 is formed with an access port 100 allowing accessibility to front sections 78 (FIG. 7).

Referring to FIGS. 7, 9, 13 and 14, second compartment 66 may be formed with suitable openings such as opening 66e (FIG. 9) to allow a reciprocable inserter 1.02 to place partitions 104 therethrough, and into entry section 72, and extending up into low-pressure chamber 54 (FIG. 7). The openings may take the form of slots. Reciprocable inserter 102 (FIG. 14) includes a push rod 102a with a push plate 102b having slots 102c formed therein (FIG. 14) for allowing fixed attachment thereto of partitions 104. As known in the prior art, other means are available to fixedly attach partitions to ram plate 102b.

Referring to FIGS. 13–14, reciprocable inserter 102 is actuable to a first position with partitions 104 inserted through entry section 72 and up into low-pressure chamber 54. The partitions may be guided through the entry section and low-pressure chamber by forming suitable slots 106 in first compartment 52.

Reciprocable inserter 102 is designed so that, under the force of low-pressure compressor 96, it will retract downwardly from first compartment 52, into entry section 72. Such retraction allows low pressure compressor 96 to transfer an amount of dry blend to entry section 72 while keeping the blend unmixed due to partitions 104. Inserter 102 is actuable downwardly to a third position where the partitions are completely removed from entry section 72 through slots 66e leaving the low-pressure compressed, unmixed blend 10 in entry section 72. High-pressure compressor 98 can then be activated to compress dry blend 10 as described in connection with FIG. 7.

Turning now to FIGS. 17–20, a preferred embodiment of the high-pressure compressor is shown at 198, including a ram member 198a fixedly attached to holder structure 198b which is fixedly attached to a support plate 198c. The three just mentioned components may be made of metal and :may be attached by welding. Opening structure 198a₁ is formed in ram member 198a, which member includes a front surface 198a₂. Like the above-described embodiment of high-pressure compressor 98, opening structure 198a₁ provides openings for receiving guide structure and corresponding strands (undepicted) as described above.

Figure 19:
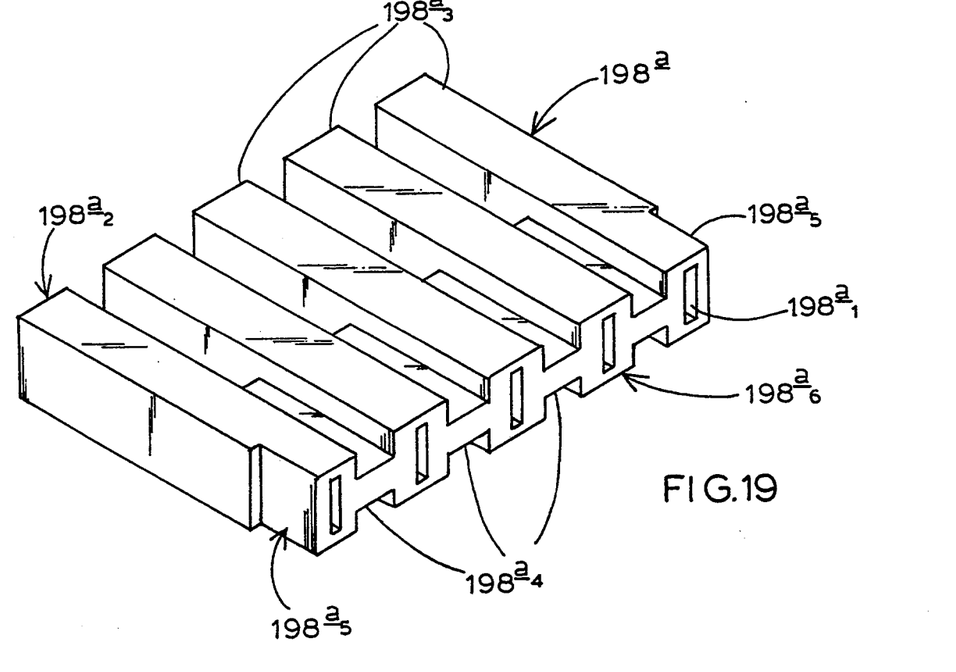
FIG. 19 is an enlarged isometric view of one of the components shown in FIG. 17 after it has been isolated from the rest of the apparatus.

As best shown in FIG. 19, ram member 198a is preferably constructed from metal and shaped as parallel block, or tooth-like submembers 198a₃ spaced apart by spacer submembers 198a₄. Notches 198a₅ are formed adjacent a rear surface 198a₆ for fixed attachment (such as by welding) to corresponding sides of holder structure 198b (see FIG. 17).

Figure 17:
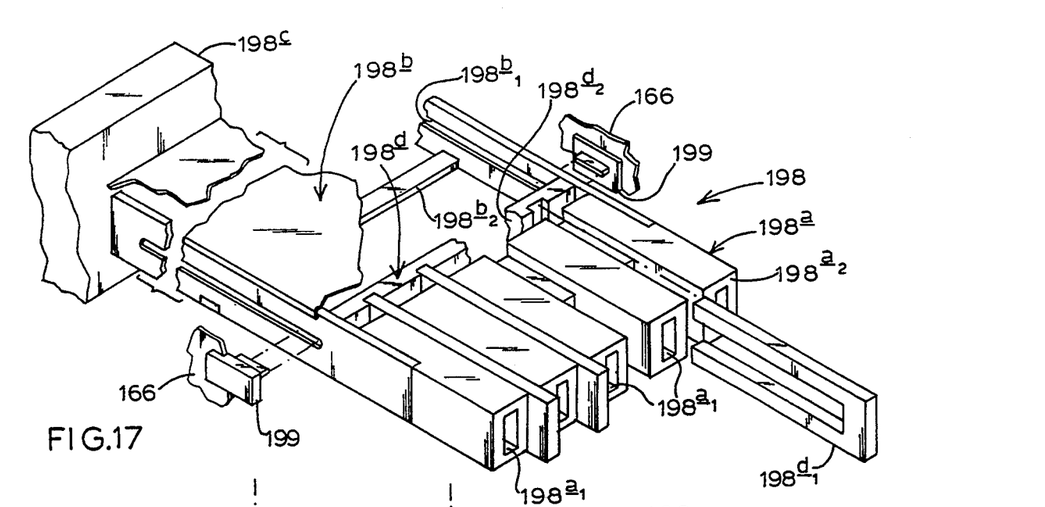
FIG. 17 is like FIG. 16, only showing the preferred embodiment of the same certain components of the apparatus of the invention.

Referring to FIGS. 17 and 19, a cleaner member 198d is also provided which is circumscribingly and floatably positioned relative to ram member 198a for reasons to be described. Cleaner member 198d includes plural cleaner forks 198d₁ which are attachable in corresponding slots formed in an impact bar 198d₂. Referring to FIGS. 17 and 19, assembly of ram member 198a and cleaner member 198d involves first positioning cleaner forks between tooth-like submembers 198a₃, and then attaching impact bar 198d₂ as by welding the corresponding ends of the forks after positioning them in the slots formed therein.

Figure 18A:
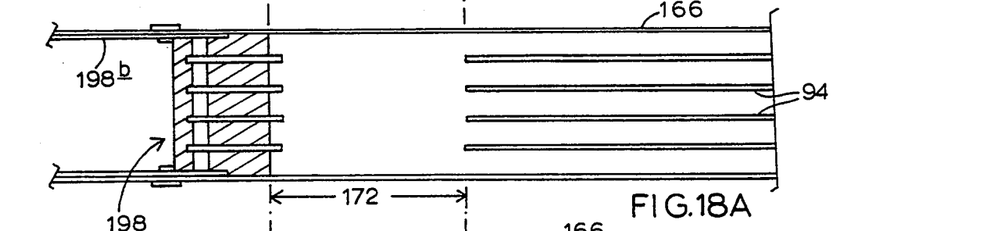
FIGS. 18A-C are top views of the components shown in FIG. 17 in certain positions before, during and after a high-pressure compression stroke has been actuated.
Figure 18B:
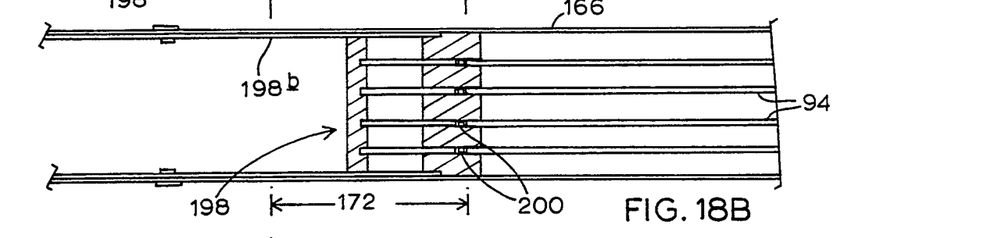
Figure 18C:
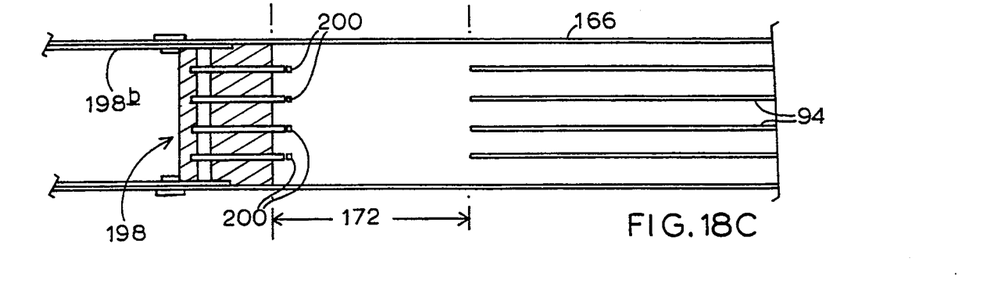

Referring to FIGS. 17–18C, holder structure 198b is formed with aperture structure such as opposing elongate openings 198b₁ for receiving stop structure such as opposing stop members 199 that are fixedly attached to inside surfaces of second compartment 166. The significance of the stop members will be described below in connection with the operation of the invention. Finally, holder structure 198b is formed with a cross bar 198b₂ to suitably reinforce it for supporting/holding ram member 198a.

OPERATION

Referring to FIG. 1, ambient temperature, dry blend 10 is made by selecting quantities of pieces 14 and filler particles 16, and dry mixing them in a rotatable, oscillatible, or shakable mixing vessel or drum 12. To obtain a cohesive thermoplastic composite from dry blend 10, filler particles 16 may form up to 60% by weight of the blend.

Referring to FIG. 6, dry mixing may be performed in vessel 112 by successively layering woven fabric filler sections 116 between pieces 114. To practice the below-identified method, known processing equipment including a vertical chamber could be used such as that disclosed in U.S. Pat. No. 3,483,597 to Windeler et. al, which is incorporated herein by reference. The vertical chamber is preferred with such a layered blend to ensure that the layers will remain in place during processing to form a thermoplastic composite the cross section of which is characterized by a series of such layers. Of course, the corresponding layers in the formed thermoplastic composite will be compressed greatly relative to that shown in FIG. 6 due to the below-described method.

Referring to FIGS. 1B–3, the method of making a thermoplastic composite is practiced by selecting and dry mixing at ambient temperature pieces 14 and filler particles 16 as described above to form a blend 10. Next, blend 10 is formed into a thermoplastic composite. The forming step includes placing a desired amount of the blend into chamber 22 as shown in FIG. 1B. Once the amount of blend 10 is in place, ram 24 is directed under the control of a suitable hydraulic power device (undepicted) to move through the chamber as shown in FIGS. 1B and 3. As ram 24 moves blend 10 through the chamber, a compressing step is performed in compression zone A and a heated compressing step is performed in heated compression zone B.

Referring to the right of FIG. 3, the blend becomes a molten thermoplastic composite 40 in zone B. The method of making a thermoplastic composite includes retracting the ram and repeating the placing, compressing, and heated compressing steps.

Upon exiting the chamber through extruder die 23, composite 40 can be cooled and further processed into a desired shape using conventional :means. Those skilled in the art know that composite 40 may be formed in any number of desired shapes by using a suitable extruder die, and further by using heated roll forms (undepicted) if it is desirable to form sheets of the composite.

To perform the heated compressing step, those skilled in the art know to use conventional heaters such as strip or platen heaters which may be attached to the outside of chamber 22. Other known conventional heaters include rod heaters (suitably positioned in chamber 22) or steam/hot-oil heaters (suitably positioned outside chamber 22).

The apparatus of the present invention provides for formation of thermoplastic composite material with corresponding filler particles having an outer dimension of greater than ⅛ inch across. Before now such a composite has not been obtainable because conventional pre-mixes of thermoplastic and filler particles require additional mechanical mixing in a heated environment (so-called wet mixing) to properly blend pieces and filler particles to produce a cohesive composite. A corresponding limitation of such conventional processes is that the extruders which perform the mechanical mixing/heating function are not operable with filler particles having an outer dimension of greater than ⅛ inch across.

As an example of the method allowing for use of relatively large filler particles, FIG. 5 shows that rod-shaped filler particles 39 may be processed through chamber 35 using rams 38a, 38b. Filler particles 39 may be ¼ inch in diameter and 12 inches long.

The method of making thermoplastic composite also includes repeating the above-described selecting and dry-mixing steps for respective quantities of second filler particles and pieces. For example, referring to FIGS. 1 and 4, the dry mixing step could be performed to make three different blends 210a–c by first mixing pieces 14 and filler particles 216a, then mixing the pieces and filler particles 216h, and then mixing the pieces and filler particles 216c. Each of blends 210a–c could be placed in chamber 22 from respective sections 34a–c of hopper 30. After practicing the above-described method, a zoned thermoplastic composite 240 is formed. Composite 240 will have different properties in each of zones 240a–c depending on the choice of pieces and filler particles used to form each zone.

Those skilled in the art know that certain thermoplastics may be chosen for superior compressive strength, wear resistance, etc. Likewise, those skilled in the art know that filler particles may be chosen to vary physical properties. In addition, the choice of thermoplastic or filler for a given zone may be varied due to the cost of raw materials.

Also, combinations of expanded and unexpanded thermoplastics may be used in blend 10, such as EPS and high density polyethylene (HDPE), as long as the blend is at least 40% by weight expanded thermoplastic. Blend 10 may also include combinations of different types of expanded thermoplastics.

Referring to FIGS. 7–16, a first embodiment of apparatus 50 of the present invention operates as follows. At the outset, it should be understood that various moving elements of apparatus 50 are actuated using suitable control circuitry (shown schematically in FIG. 7 by box 108) that is operatively connected to the apparatus via conductors 108a. A preselected amount of a dry blend is dispensed from hopper 57 similar to that shown in FIG. 1B where dry blend 10 is dispensed from hopper 18.

The dispensed dry blend is then transferred by feeder 56 via feeder channel 63 to first compartment 52 where low-pressure compressor 96 is actuated to extend downwardly into entry section 72. For the first sequential transfer of dry blend to entry section 72, strands 76 and tensioning members 80 are not positioned in entry section 72. Rather, high-pressure compressor 98 (FIG. 9) is actuated to perform a compression stroke which causes the dry blend to be compressed in an area downstream of entry section 72 as shown in FIG. 7.

Next, referring to FIG. 10, a suitable bar 105 is placed in front of high-pressure compressor 98 via access port 100 (FIG. 9) and compressor 98 is again actuated to make a compression stroke causing bar 105 to be pushed into compressed dry blend 10 as shown in FIG. 10.

Figure 12:
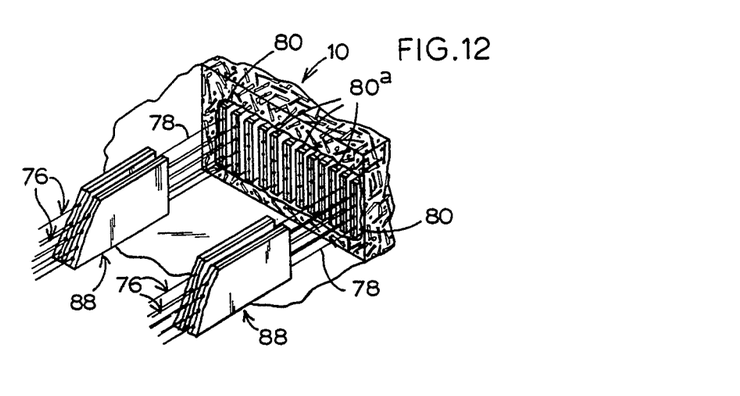
FIG. 12 is like FIG. 10 only that a somewhat larger portion of the high-compression chamber is shown with tensioning members and guide structure of the apparatus of the invention disposed therein.

Next, bar 105 is removed and, referring to FIG. 12, tensioning members 80 are attached to desired groups of strands 76 and then the tensioning members are inserted into the first amount of dry blend to maintain tension on the strands during subsequent sequences of feeding, low-pressure compressing and high-pressure compressing preselected amounts of dry blend. As shown in FIG. 12, a series of dummy tensioning members 80a are positioned in the recess in compressed dry blend 10 to ensure that the tensioning members with strands maintain a proper orientation.

The feeding and compressing steps are now repeated, and for each of these subsequent steps low-pressure compressor 96 will loosely compress amounts of the dry blend downwardly into entry section 72 and around strands 76 which now extend into the entry section.. Members 80, 80a will be embedded in a front portion of the molten composite that eventually exits the high-compression chamber. The members can be cut from the molten composite before or after cooling, and then reused for subsequent production runs.

High-pressure compressor 98 will move bidirectionally in second compartment 66 to compress each amount of dry blend transferred by low-pressure compressor 96. As it moves, guide structure or structures 88 will remain stationary. As shown best in FIG. 7, structure 88 extends through entry section 72 to guide and protect strands 78. It has been found that best results with operation of apparatus 50 are obtained by having a first section of second compartment heated from outside chamber 68 (using suitable heaters) so that a suitable length, i.e. about 4 feet, is hollow (no heat vanes). Of course it should be understood other such chamber lengths may be desired based on variables such as surface temperature and thermal characteristics of the molten composite, and feed rate of the dry blend into the apparatus. The above-mentioned hollow, heated section ensures that material flow will continue through chamber 68 into the heat-vane-containing area of the chamber. Referring to FIG. 8, such a first section would be the section of chamber 68 where the dry blend is illustrated.

Referring ahead to FIGS. 17–19, high-pressure compressor 198, the preferred embodiment of this component of the apparatus of the invention, will also move bidirectionally in second compartment 166 to compress the dry blend. High-pressure compressor 198 will provide optimal heating/compression of the dry blend by extending during its high-pressure compression stroke into the heat-vane containing section of second compartment 166 (see FIG. 18B). Such extension increases the movement of dry blend through the unheated section of second compartment 166 during operation. The increased movement produces a corresponding increase in the capability of the invention to efficiently heat the composite material. As a result, it has been found that a substantially shorter length of compartment 166 can be used. For example, with high-pressure compressor 98 (FIG. 7), second compartment 66 should be about 8-feet long for an approximately 15-sq. inch inside area of chamber 68. With high-pressure compressor 198 (FIGS. 17-19), second compartment 166 can be constructed at a length of about 1.5-feet for a like area chamber. With respect to the above two, alternative high-pressure compressors, applicant has found that the temperature in second compartment 66 should be relatively low, i.e. 300-400 degrees F., so that the molten-composite will not be charred during processing. For the shorter lengths possible with second compartment 166/compressor 198, the processing temperature can be relatively high, i.e. 550-700 degrees F. For the latter version, it is presently contemplated to have an 8-ft. heated section (undepicted) downstream of second compartment 166. Such section will be at about 350-450 degrees F., and will allow the molten material to further coalesce. Material that exits such heated section is then usable for any desired extrusion/forming operation using known suitable means.

Still focusing on FIGS. 17-19, cleaner member 198$d$ is floatably positioned relative to ram member 198$a$ so that it will be out of the way during the compression-/extension stroke (FIG. 18B) but will move forward to an extended, to-be-described cleaning position during a non-compression/retraction stroke (FIGS. 17, 18A and 18C). Referring to FIGS. 18A-C, this cleaning feature of the cleaner member is best shown in a three-step sequence. While no dry blend is shown it should be understood that appropriate amounts would be sequentially added to second compartment 166 as described above.

The idea is that dry blend would be dropped into entry section 172 when compressor 198 is in a retracted position (FIG. 18A). Then, the compressor would be actuated to its extended position pressing the dry blend into the heat-vane section of the compartment (FIG. 18B). In addition to the actuation mechanism., such extension is made possible because aperture structure 198$b_1$ allows stop members 199 to travel therein which in turn allows compressor 198 to move forward in second compartment 166. In the extended position, a certain amount of dry blend will become trapped between tooth-like members 198$a_3$ as shown at 200 in FIG. 18B.

Referring to FIG. 18C, upon actuating compressor 198 to its retracted position, impact bar 198$d_2$ will contact stop members 199 causing the impact bar to be positioned closer to ram member 198$a$ (compare relative position of impact bar and ram member in FIGS. 18A and C to that in FIG. 18B). When ram member 198$a$ and impact bar 198$d_2$ are closer together it means that cleaner member 198$d$ has floated forward with respect to the ram member, i.e. cleaner forks 198$d_1$ assume their extended position which pushes the trapped material 200 out from between tooth-like sub-members 198$a_3$(FIG. 18B) and into entry section 172 where it can be compressed with the next charge of dry blend into that section.

Referring back to FIGS. 7-16, if it is desired to use apparatus 50 to form a zoned reinforced thermoplastic composite such as the zoned thermoplastic composites described in connection with FIG. 4, two suitable partitions would have to be formed in hopper 57 like partitions 32 of modified hopper 30 (FIG. 4). Also, two partitions (undepicted) would have to be positioned in feeder channel 63 so that they are aligned with the partitions in the hopper. Feeder structure 62 would have to be structured with suitable slots to allow it to move bidirectionally with respect to the partitions in channel 63, thus to transfer dispensed amounts of the blend to first compartment 52 as described above.

Next, reciprocable inserter 102 (FIG. 14) is extended to its first position with partitions 104 inserted through entry section 72, up into low-pressure chamber 54, and through openings such as opening 66$e$. At this point zoned blends of material could be fed from feeder 56 (FIG. 7)into first compartment 52 through feeder port 64 (FIG. 14) where each blend would remain in corresponding zones via partitions 104. Next, low-pressure compressor 96 would be actuated to perform a compression stroke where it moves downwardly causing partitions 104 attached to inserter 102 (FIG. 14) to retract downwardly to a position where partitions 104 extend into entry section 72 only. Then inserter 102 would be actuated to move downwardly to the third position with the partitions out of entry section 72. The remaining steps would be the same as that described above.

It should also be understood that the following elements of the apparatus of the invention may be varied:
 (1) the numbers of strands 76/guide structure 88;
 (2) the number and orientation of the strands in chamber 68;
 (3) the dimensions of heat vanes 94;
 (4) the dimensions of compartments 52 and 66; and
 (5) the number of partitions 104 used with inserter 102.

Also, the force employable by the low-pressure and high-pressure compressors may be varied. It is presently proposed to design high-pressure compressor 98 so that it will compress dry blend 10 with a force of approximately 2,000 p.s.i.

Those skilled in the art will also appreciate that the production rate of apparatus 50 may be varied as desired by varying, among other things, the length of chamber 68, the force of compressor 98, and the widths of the paths defined by adjacent heat vanes 94.

The design of chamber 68 should present the least amount of heated surface area necessary to melt blend 10 so that blend 10 encounters minimal surface friction. The arrangement and size of vanes 94 in chamber 68 will vary depending on the thermal characteristics of blend 10 and the pressure exerted by the rams. However, vanes 94 must heat blend 10 sufficiently so that the exit temperature at 70$b$ is greater than at entrance section 70$a$, to avoid blend 10 exiting apparatus 50 at other than exit 70$b$.

It should also be understood that members 80,80$a$ could be used with an apparatus that includes only one compression chamber. Such a single-compression chamber apparatus would include elements like that described in connection with second compartment 66 above. The only difference would be that amounts of dry blend 10 would be dropped directly from hopper 57 (FIG. 7) through port 74 and into entry section 72.

While the present invention has been shown and described with reference to the foregoing preferred embodiment, it will be apparent to those skilled in the art that other changes in form and detail may be made therein without departing from the spirit and scope of the invention as defined in the appended claims.

I claim:

1. Apparatus for making a reinforced thermoplastic composite from a dry blend of expanded thermoplastic pieces and filler particles, comprising:

an elongate compartment defining a high-pressure compression chamber and including open ends, a feeder port and an access port, and an entry section;

a feeder for sequentially transferring preselected amounts of the blend to the compartment through the feeder port;

a plurality of reinforcing strands to be fed through the chamber, with each such strand having a front section which is positioned in the entry section;

a plurality of tensioning members being removably attachable to desired front sections of the strands after a first amount of the blend has been compressed in the chamber, the front sections being accessible for attaching the members via the access port, and the members being insertable into the first amount to maintain tension on the strands during subsequent compressing of additional amounts of the blend;

means for heating the chamber;

a high pressure compressor to compress the blend around the strands in the heated chamber to form a molten reinforced thermoplastic composite, and to transfer the molten composite out of the chamber where it can cool, thus to form a reinforced thermoplastic composite.

2. The apparatus of claim 1 wherein the compressor is structured to move bidirectionally in compression strokes.

3. The apparatus of claim 2 wherein the heating structure takes the form of a plurality of heat vanes positioned in the high-pressure chamber.

4. The apparatus of claim 3 wherein the vanes are positioned to define paths of varying widths through which the blend is pushed by the high-pressure compressor.

5. The apparatus of claim 4 wherein the compressor is hollow and includes a ram plate with opening structure formed therein, and further including protective guide structure positionable around the strands and extending substantially through the compressor and the opening structure, the guide structure protecting the strands when the compressor moves in strokes.

6. The apparatus of claims 1 or 4 wherein the members are wedges.

* * * * *